April 26, 1938.  A. J. BARTHLOME, JR  2,115,477
HAND SHIELD
Filed Feb. 2, 1937
Fig. 1.
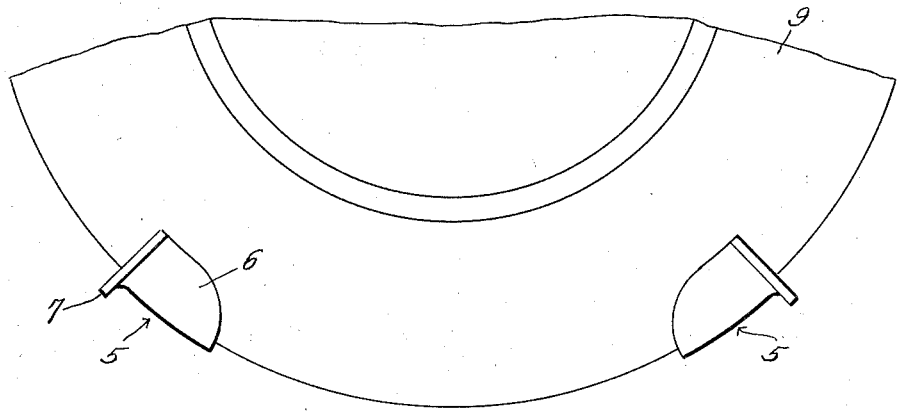
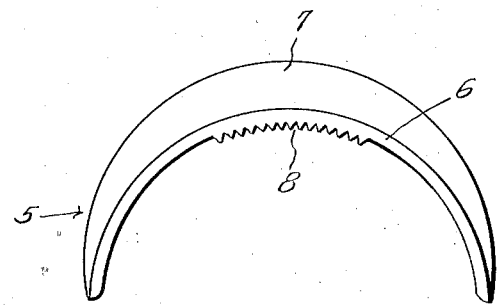
Fig. 2.
Inventor
A. J. Barthlome, Jr.
By Clarence A. O'Brien
Hyman Berman
Attorneys Patented Apr. 26, 1938

2,115,477

UNITED STATES PATENT OFFICE 2,115,477

HAND SHIELD

Alfred J. Barthlome, Jr., Hondo, Tex.

Application February 2, 1937, Serial No. 123,688

2 Claims. (Cl. 294—25)

This invention relates in general to shields for protecting the hands and more particularly to shields for protecting the hands against being soiled incidental to changing pneumatic vehicular wheels or tires therefor.

The invention together with its objects and advantages will be best understood from a study of the following description taken in connection with the accompanying drawing wherein:—

Figure 1 is a side elevational view illustrating the application of the invention.

Figure 2 is an end elevational view of a hand shield embodying the features of the present invention.

Referring to the drawing by reference numerals it will be seen that in accordance with the present invention I provide a pair of hand shields 5 for protecting the hands when repairing or changing pneumatic tires, such as the pneumatic tire, a portion of which is shown in the drawing and indicated by the reference numeral 9.

Each hand shield 5 is formed from a single blank of relatively semi-rigid material such as vulcanized rubber or the like, cut, shaped and dimensioned to provide a semi-cylindrical body portion 6 of a cross-sectional shape to snugly fit about the tread portion of a pneumatic tire casing, and provided at one end with an outstanding protector flange 7.

On the concave side thereof the body portion 6 of the shield at about the longitudinal center thereof is provided with a toothed, serrated or otherwise formed roughened area or contact surface 8 that engages the tread portion of the tire in a manner to preclude a shifting of the shield circumferentially of the tire casing when the shield has been properly applied to said casing.

In operation, when it is desired to remove or replace a pneumatic tire it is only necessary to apply the shields 5 to the tire casing at suitably circumferentially spaced points on the tire casing, with the shields straddling the tread portion of the tire casing, and the roughened surfaces 8 of the shields engaging the tread portion of the tire casing to preclude shifting of the shields circumferentially on the casing.

With the shields thus applied to the tire casing, the hands of the operator are placed against the exterior surfaces of the shields and are thus protected from direct contact with the wall of the tire casing, with the result that the hands are not likely to become soiled to any appreciable extent.

Thus with an operator equipped with a pair of hand shields embodying the features of the present invention the changing of an automobile tire may be accomplished without getting the hands of the operator covered with grime, dirt and grease which is usually the case of one changing a pneumatic tire.

It is thought that a clear understanding of the construction, utility and advantages of an invention of this character will be had without a more detailed description, it being further understood that the shields render the changing of tires more easy; and that if desired the shields for both hands, may, in actual practice, be made integral, one with the other.

Having thus described the invention, what is claimed as new is:—

1. A pneumatic tire handling device comprising a rigid plate constituting a hand grip, said plate being arcuate in cross section for receiving the tread of the tire on its inner surface and a flange on the outer surface of the plate forming an abutment for the hand.

2. A pneumatic tire handling device comprising a rigid plate constituting a hand grip, said plate being arcuate in cross section for receiving the tread of the tire on its inner surface, teeth on the inner surface of the plate to secure the tire against movement relative to the plate and a flange on the outer surface of the plate forming an abutment for the hand.

ALFRED J. BARTHLOME, Jr.